US006887382B2

(12) United States Patent
Moutray et al.

(10) Patent No.: US 6,887,382 B2
(45) Date of Patent: May 3, 2005

(54) SYSTEM FOR TREATMENT OF MANURE

(75) Inventors: Jim Moutray, Ames, IA (US); Paul Joe Solar, Cedar Rapids, IA (US)

(73) Assignee: ABI Alfalfa Inc., Lenexa, KS (US)

( * ) Notice: Subject to any disclaimer, the term of this patent is extended or adjusted under 35 U.S.C. 154(b) by 59 days.

(21) Appl. No.: 10/361,449

(22) Filed: Feb. 10, 2003

(65) Prior Publication Data

US 2004/0154981 A1 Aug. 12, 2004

(51) Int. Cl.[7] .............................. C02F 3/32; A01C 3/00
(52) U.S. Cl. .................. 210/602; 210/928; 47/DIG. 10
(58) Field of Search ................................ 210/602, 747, 210/170, 908, 928; 47/DIG. 10

(56) References Cited

U.S. PATENT DOCUMENTS

| | | | |
|---|---|---|---|
| 3,894,355 A | * | 7/1975 | Carothers .................. 47/48.5 |
| 4,515,311 A | | 5/1985 | Takata |
| 4,956,093 A | | 9/1990 | Pirbazari et al. |
| 5,195,455 A | | 3/1993 | van der Lely et al. |
| 5,443,730 A | | 8/1995 | Letourneux et al. |
| 5,462,232 A | | 10/1995 | Vastveit |
| 5,501,718 A | | 3/1996 | Bandurski |
| 5,682,829 A | | 11/1997 | Sukup |
| 5,709,800 A | | 1/1998 | Ross et al. |
| 5,755,058 A | | 5/1998 | Guyot et al. |
| 5,811,007 A | * | 9/1998 | Stewart et al. .............. 210/602 |
| 5,911,195 A | | 6/1999 | Tripp et al. |
| 6,014,948 A | | 1/2000 | Gordon |
| 6,071,418 A | | 6/2000 | Tai |
| 6,138,928 A | | 10/2000 | LaRue et al. |
| 6,171,499 B1 | | 1/2001 | Bouchalat |
| 6,250,237 B1 | * | 6/2001 | Licht .......................... 111/200 |
| 6,427,612 B1 | | 8/2002 | Huffman |
| 6,497,741 B2 | | 12/2002 | Sower |
| 6,503,394 B1 | | 1/2003 | Hoyt |

FOREIGN PATENT DOCUMENTS

WO         WO 93/24418       * 12/1993

OTHER PUBLICATIONS

Moutray et al., Traffic Tested?, 2000, America's Alfalfa, www.americasalfalfa.com/traffic_tested.htm.*
Bauchan et al., Report on the Status of Medicago Germplasm in the United States, Oct. 2000, Alfalfa Crop Germplasm Committee.*
Rick Mooney, Kura's Cure, Jan. 2001, Hay and Forage Grower, Primedia, Inc., www.hayandforage.com/mag/farming_kuras_cure.*
Cherney et al., Grass Management Update, 2000, www.n-ny.org/articles/GrassUpdate2000.htm.*

* cited by examiner

*Primary Examiner*—Fred G. Prince
(74) *Attorney, Agent, or Firm*—Lathrop & Gage L.C.

(57) ABSTRACT

A waste management system dispenses liquid manure and/or sludge products onto land on which is grown a cultivar that is specially selected to perform with improved yields and stand persistence under conditions of heavy traffic, grazing, manure application and/or fertilizer loading. Selective breeding and/or selection for improved performance under conditions of heavy traffic, grazing and defecation has produced cultivars that demonstrate improved performance in this use.

35 Claims, 2 Drawing Sheets

SYSTEM FOR TREATMENT OF MANURE

BACKGROUND OF THE INVENTION

1. Field of the Invention

The invention pertains to the field of organic waste disposal from municipal sewage facilities, feedlots, dairies, poultry barns, swine farms, and the like. More specifically, the organic waste is disposed of by applying sludge or manure to a crop.

2. Description of the Related Art

Various facilities generate or gather organic waste requiring disposal. For example, feedlots, animal barns, agroindustrial plants, municipal sewage plants, and farms that keep large numbers of animals must process enormous quantities of organic waste for disposal, often in the form of liquid manure. The disposal of untreated organic waste potentially pollutes water by adding pathogens. Waste substances contain chemicals and decomposable substances that deplete oxygen in water. Leaching of these substances or direct discharge into water can impair the capacity of the receiving water to support life. Additionally, these facilities may release acrid gasses that are unpleasant to smell and contribute to global greenhouse effects.

In particular, agroindustrial livestock and poultry production methodologies increasingly rely upon centralized facilities having a high animal population density. Immense volumes of excrement build up in these facilities unless they are periodically cleaned. Much heavy manual labor is avoided by providing such facilities with waste disposal systems. For example, U.S. Pat. No. 5,911,195 issued to Tripp et al. describes a swine-raising facility with waste management and recycling. The pigs are raised in stalls having a heated floor with a grating that permits waste to enter gutters. Waste falls or is washed into in the gutters, which convey the waste to a site where liquid manure is sprayed onto straw, sawdust, or another substrate for composting and eventual use as fertilizer. U.S. Pat. No. 6,014,948 issued to Gordon describes a shelter for shading and cooling dairy cows, where the roof structure channels rainwater into the interior of the structure for flushing waste from the feeding area. U.S. Pat. No. 5,195,455 issued to van der Lely et al. describes a sensor-based system that detects the presence of waste and, by the application of loud noises and/or electric shocks, discourages dairy cows from defecating outside a designated area. Electronic devices sense or detect waste that the animals deposit in the defecation area. Waste detection is followed by flushing the waste into a drain system for disposal.

In planning for a National Animal Health Monitoring System (NAHMS) study of the dairy industry during 1996, the United States Department of Agriculture (USDA) surveyed dairies in 20 states to describe current use of animal waste handling systems. The study collected data from 1,219 producers each having 30 or more dairy cows. The producers represented seventy-nine percent of the milk cows in the United States.

Most operations with fewer than 100 dairy cows use some form of solid waste storage (79.2 percent). As herd size increases, solid waste storage methods become less common (59.5 percent in operations of 200 or more cows). Use of methods for storing manure in a liquid form increase with herd size. The two primary storage methods are slurry and lagoon. With the slurry method, manure is stored as a thick liquid in a pit located under the barn floor or in a tank or earth-basin until it is applied onto land. With lagoons, manure is often subjected to anaerobic and/or aerobic microbial digestion, as well as chemical treatment. Manure is diluted with water, e.g., water from flush systems and milking-parlor wash water. Slurry systems are more common than lagoon systems for herds of fewer than 200 cows. Both systems are equally popular among producers with 200 or more cows. Over 90 percent of herds with 200 or more cows have some type of liquid manure storage system. Since evaporation reduces total lagoon volume, especially in more arid parts of the country, so lagoons are most common in the western U.S. Producers with liquid manure systems in the midwest and northeast prefer slurry systems over lagoons.

The USDA study also assessed management practices associated with minimizing environmental consequences of manure applications. Manure nutrient analysis, manure application rates based on crop nutrient requirements, manure incorporation, and no-spreading buffer zones around waterways are four management practices designed to limit environmental impacts of waste handling. Most dairy producers (89.4 percent) use one or more of these manure management practices. Nearly half (43.2 percent) of the producers who applied manure to land indicated that they established manure application rates based on manure nutrients or crop needs. Less than one-seventh (14.0 percent) of producers analyze their cows' manure for nutrient content, however. Producers from larger herds (100 or more dairy cows) are more likely to analyze the nutrient content of their manure than their small herd counterparts.

Manure incorporation into soil within 24 hours minimizes odors and nitrogen loss to the atmosphere. Under one in seven producers with fewer than 100 cows (15.8 percent) incorporate their manure into soil within 24 hours. The percentage increases with herd size to over one-third (38.7 percent) of producers with 500 or more cows. More than three-quarters (78.1 percent) of producers who spread manure reported having buffer zones of 50 feet or more where manure was not spread.

USDA has studied the relationship between good waste management and good milk production management. Dairy producers who used at least three of these waste management practices were categorized into one group. Those who use fewer than three such practices were placed in another. Producers were also grouped into quartiles by their milk production per cow. Producers in the top per-cow production group were twice as likely to use at least three manure management practices than were those in the bottom per-cow production group (32.5 percent vs. 14.7 percent). Thus, the USDA has determined that good waste management practices do not in conflict with milk production per cow. Most dairy producers use at least one management practice designed to limit environmental impacts of dairy waste management.

The practice of flushing animal and human wastes leads to another problem, namely what to do with the effluent material. Governmental agencies including state and local governments, as well as the United States Environmental Protection Agency (EPA), increasingly impose stricter regulatory controls on organic waste sources. Municipal sewer systems have been federally regulated for some time, for example, under the Clean Water Act. Regulatory agencies increasingly recognize that animal waste, if not managed properly, can pollute nearby water bodies. Agricultural runoff is rich in nutrients including nitrogen and phosphorous. These substances encourage growth of dangerous pathogens, such as *Pfisteria piscicida*, which is frequently responsible for major fish kills, disease events in several mid-Atlantic states, and may pose a risk to human health.

Despite these problems, organic waste has beneficial value when it is used as fertilizer for plants. This waste is preferably treated by a variety of processes to remove pathogens and/or reacted to create useful byproducts. U.S. Pat. No. 4,956,093 issued to Pirbazari et al., describes a wastewater treatment system in which active particulate material, such as activated carbon, mixes with dairy wastes under turbulent conditions after pretreatment with alum or ferric chloride. U.S. Pat. No. 5,709,800 issued to Ross et al. describes using a high temperature reactor to process organic wastes by catalytic reaction, such as a silicate or phosphate-catalyzed reaction with metal nitrites. U.S. Pat. No. 6,503,394 issued to Hoyt describes a system that thermally processes up to 10% of raw organic waste in a digester while the remaining waste is deposited in a lagoon. The digested waste increases the production of methane when fed to the lagoon, and the methane can be gathered for beneficial uses. Wastewater lagoons can be maintained at predetermined conditions for bacterially enhanced digestion, as shown in U.S. Pat. No. 6,071,418 issued to Tai where a stratified lagoon is ozonated to provide an aerobic cap with an anaerobic bottom zone.

The term "liquid manure" describes raw excrement, such as feces and urine, which is sometimes slurried with water, as well as excrement that has been processed by the aforementioned processing systems. Liquid manure contains both solid and liquid components, but has a sufficient liquid content to permit the material to flow. USDA studies have determined that the content of liquid manure varies by:
1. composition of the feed ration;
2. amount of bedding and water added or lost:
3. manure collection, handling and storage practices;
4. method and time of land application;
5. climate; and
6. animal type Table 1 shows the average nutrient content and range found in dairy manure in the state of New York, and is representative of an average dairy manure:

TABLE 1

| Nutrient | Solid or Semi-Solid | | Liquid | |
|---|---|---|---|---|
| | Average lbs/ton | Range | Average lbs/1000 gal. | Range |
| Total N | 11 | 6–17 | 32 | 9–63 |
| Ammonium-N | 4 | 1–7 | 15 | 2–42 |
| Organic-N | 7 | 4–11 | 17 | 3–35 |
| $P_2O_5$ | 5 | 3–12 | 14 | 4–34 |
| $K_2O$ | 9 | 2–15 | 30 | 3–56 |

Liquid manure can be converted into a variety of useful products. U.S. Pat. No. 4,956,093 issued to Halfter describes a system for processing liquid manure to harvest bound ammonia for use in fertilizer, with separation of methane and carbon dioxide byproducts for combustion. U.S. Pat. No. 6,497,741 issued to Sower describes a process for converting the solids content of liquid manure from swine into a granular slow-release fertilizer. In like manner, U.S. Pat. No. 6,171,499 issued to Bouchat describes an advanced municipal and industrial sludge processing plant that produces a granular fertilizer from liquid manure. U.S. Pat. No. 5,885,461 issued to Tetrault et al. describes a system that collects liquid manure from swine and processes the same by physical and chemical techniques to produce a dried sludge that can be safely returned to the environment. U.S. Pat. No. 5,443,730 issued to Letourneux et al. describes a process for the purification of a urban organic wastes. The waste is submitted to a reactor for mixing and reaction with active alumina and lime. A mineral sludge and supernatant effluent are extracted by decantation or filtration. U.S. Pat. No. 5,501,718 issued to Bandurski describes the mixing of manure, sewage, or other organic waste with a carrier to form a substitute for peat moss.

While organic wastes may be treated for reduction of deleterious qualities, and useful products may result, there remains the problem of how to dispense such products. U.S. Pat. No. 5,755,058 issued to Guyot et al. describes the use of a wide spray-boom in dispensing liquid manure and related products over straw or crop residue in a field Loading of this fertilizer occurs, for example, in the range of 1000 gallons to 5000 gallons of liquid manure per acre, where 5000 gallons per acre is understood to be about the limit of tolerance for fertilizer loading. Another apparatus described in U.S. Pat. No. 5,682,829 issued to Sulkup describes a tank filled with liquid manure that is followed by a disk and nozzle assembly used to inject the liquid manure into the soil. U.S. Pat. No. 5,462,232 issued to Vastveit describes a rotating nozzle assembly for use in combination with a liquid manure spreader. A truck-mounted sludge gun may be used to dispense liquid manure or urban sewage wastes over difficult terrain, as described in U.S. Pat. No. 4,515,311 issued to Takata. Alternatively, a drag hose assembly can be pulled by a tractor and used to dispense liquid manure, as disclosed in U.S. Pat. No. 6,427,6123 issued to Huffman. Center-pivot irrigation systems may be adapted to dispense liquid manure suspensions, as disclosed in U.S. Pat. No. 6,138,928 issued to LaRue et al.

Agricultural demand for fertilizer is seasonally driven in specific localities. On the other hand, the production of organic wastes continues in large volume no matter what season it is. Periodicity in demand means that interim plans are required for disposition of such materials, at least on an interim basis between periods of seasonal need for fertilizer. A decision must be made whether to store the wastes or to dispose of them. Either decision may be subjected to complicated regulatory compliance and/or permitting processes, for example, as in the permit and review program provided for in the Minnesota Rules Chapter 7020. When a decision is made to dispose of the wastes by applying them to land, factors taken into regulatory consideration are the nitrogen demand of plants or crops to which the wastes are applied, the drainage capacity of the land, and proximity to contaminable water sources. According to these regulations, a feedlot may choose to grow plants for use in disposing of liquid manure by the application of liquid manure to a field. A maximum amount of effluent loading is permitted, and a factor in determining the maximum amount is the ability of the plants to use the nitrogen. Commercial services are available to test the manure for content in assisting an optimal delivery of manure according to manure content and plant tolerance. The plants tend to exhibit well known effects of fertilizer burning, e.g., browning, death and/or slow growth, if too much effluent is dispensed onto the plants.

SUMMARY OF THE INVENTION

The problems described above are overcome and the art is advanced by providing alfalfa and clover cultivars for use in combination with organic waste management systems. The cultivars demonstrate superior yield and persistence (stand count) advantages in comparison to other commercially available cultivars that may be used for this purpose.

The waste management system includes a supply facility for use in providing organic waste material. By way of example, the supply facility may be an agroindustrial facility (e.g., a slaughterhouse, a paper mill, a cannery, or a tannery), an animal production facility, a feedlot, a dairy, a poultry farm, or a sewage plant. The system also uses land as a disposition point for the organic waste material. A conveyance, such as a pipeline, truck, tractor, tanker, or liquid manure spreader is used to transport the organic waste material from the supply facility to the land. A crop, such as alfalfa or clover, grows on the land for use in subjecting organic waste material deposited on the land to in vivo processing, which accelerates the time that is required until a repeat application can be made. A dispenser assembly is used to apply the organic waste material to the crop. The dispenser assembly may, for example, be a center-pivot assembly adapted to dispense liquid manure, a sludge gun, a manure spreader, a tanker truck or tractor-pulled sprayer.

The crop of alfalfa or clover may be specially developed using breeder selection processes to select for healthiness and desirable phenotypical traits under conditions imposed by heavy grazing stress, heavy manure loading stress, and/or heavy equipment traffic stress during the selection process. By way of example, heavy equipment traffic stress may be imposed by tractors, trucks, harvest equipment, manure spreaders, caterpillar-tracked vehicles, and any other equipment that may be driven across a field. Beneficial cultivar traits for these conditions may be confirmed by comparative testing that demonstrates increased tolerance to such stress. For example, a breeder developed crop may be confirmed for the intended use by comparative testing that demonstrates superior performance against other cultivars that have not been specially developed to withstand such stress. By way of example, superior performance under conditions of heavy traffic is indicated by superior yield and/or superior persistence at least five percent or ten percent above the average for other commercial cultivars of comparable dormancy traits. Superior performance under conditions of heavy manure loading or heavy grazing may include yield advantages ranging from 5% to 20% or more, or from 10% to 20% or more over the average of other commercial cultivars. Superior performance under conditions of heavy manure loading or heavy grazing include persistence advantages ranging from 10% to 30% or more, 15% to 30% or more, or 20% to 30% or more.

It is sometimes the case that regulatory permitting processes are imposed upon large facilities having in excess of, for example, 300 animal units. The instrumentalities disclosed herein are particularly amenable to large scale operations, such as dairies, feedlots, swine confinements, and poultry confinements. Alternatively, the instrumentalities may be adapted for use with municipal sewage plants, for example, to dispose of sludge from a sludge production unit configured to provide the organic waste material.

The waste management system may be contiguous, for example, with the land located adjacent the system to provide grazing for dairy animals located in the facility. The waste management system may also be discontinuous, for example, where the land or other system components are located remotely from a municipal sewage plant or remotely from a dairy facility.

The cultivar may be any alfalfa or clover, but it is especially preferred to have a cultivar that is selected to survive traffic (animal or wheel), grazing, and defecation in all types of weather. The alfalfa cultivar may be a dormant, semi-dormant or non-dormant cultivar selected for these traits, as is amenable to climatic conditions in the intended environment of use. The JM-1 cultivar, which is commercially available from ABI Alfalfa as AmeriStand 403T™ is particularly preferred and is characteristic of a alfalfa cultivar selected for the desired traits. Variants of the JM-1 cultivar may also be used, such as progeny selected for additional advantages, as well as recombinant lines of this cultivar. The clover cultivar JM-3 and variants of JM-3 may also be used, such as progeny selected for additional advantages, as well as recombinant lines of this cultivar.

The waste management facility operates according to a method including the steps of:

supplying organic waste material to a facility selected from the group consisting of an agroindustrial facility, an animal production facility, a feedlot, a dairy, a poultry farm, and a sewage plant;

processing the organic waste material to provide liquid manure;

growing a crop of alfalfa and/or clover on land;

transporting the organic waste material from the facility to the land; and depositing the liquid manure on the land for use by the crop of alfalfa and/or clover to subject the liquid manure to in vivo processing.

DETAILED DESCRIPTION

There will now be shown and described a waste management system that includes a waste generating or supply facility that provides organic waste material, which is processed and dispensed onto land that contains a crop of alfalfa and/or clover. The system is shown by way of nonlimiting example according to preferred embodiments that should not be construed to provide undue limitations. For example, the system shown is self-contained and contiguous, but respective portions of the system may also be distributed over separate geographic areas.

Figure 1:
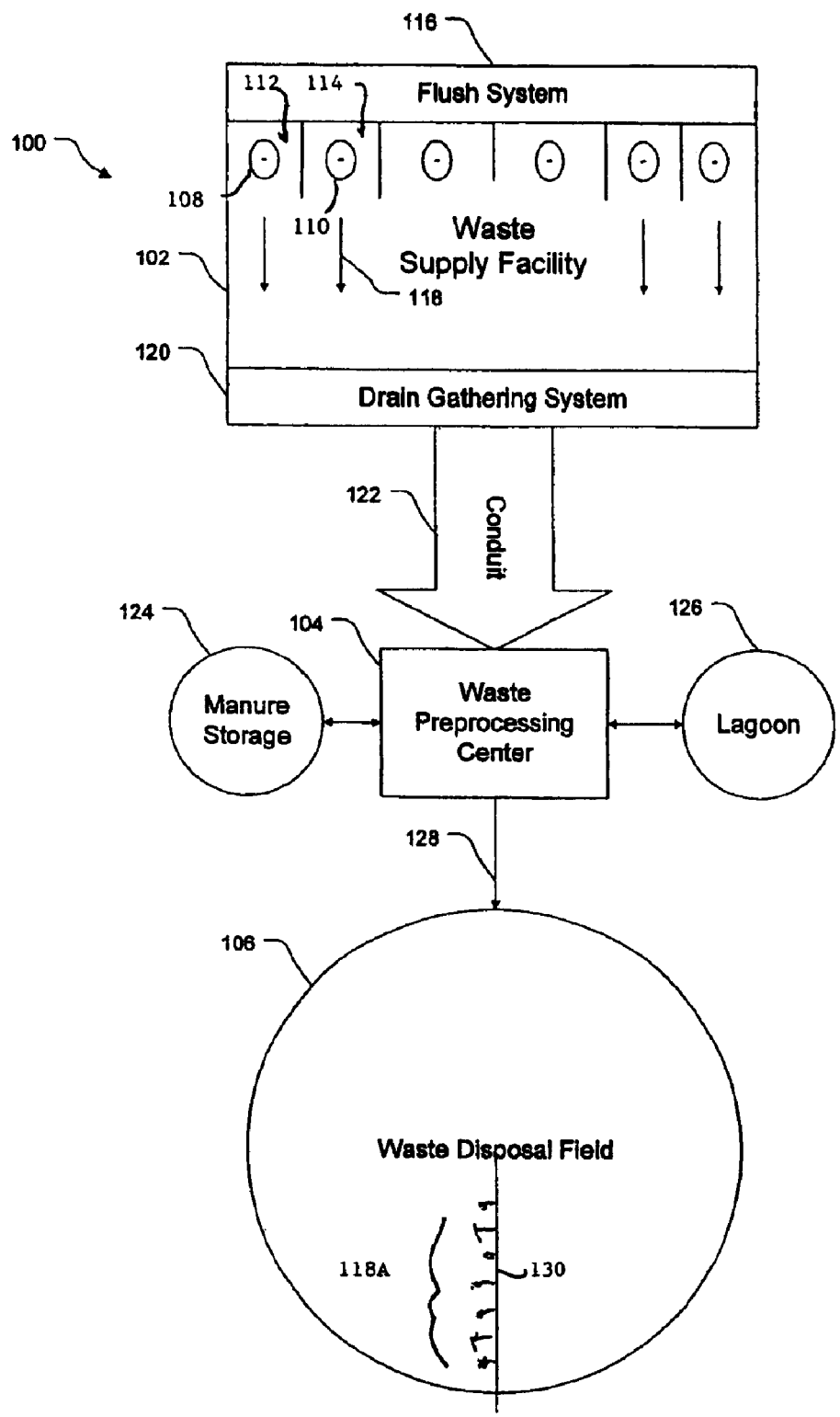
FIG. 1 shows a waste management system according to the principles described herein.

FIG. 1 shows waste management system 100. In overview, a waste supply facility 102 either supplies or generates a large volume of organic waste, which is transported to a waste processing center 104. The waste processing center 104 processes the organic waste and distributes the same for application to a waste disposal field 106 where crops may be grown. These crops may be used as food, such as grazing, for animals that reside in the waste supply facility, or such crops may be harvested and sold commercially.

The waste supply facility 102 may be a conventional agroindustrial facility, such as a tannery, a papermill, a cannery, or a slaughterhouse. Alternatively, the waste disposal facility 102 is an animal production facility, such as a swine confinement, a poultry confinement or a fish confinement. Examples of the waste supply facility 102 include a stable, a feedlot, a dairy, a poultry farm, a sewage plant, or any other facility that generates or gathers excrement. As shown in FIG. 1, according to preferred embodiments, the waste supply facility 102 is a dairy or swine confinement that houses any number of animal units 108, 110 in respective stalls 112, 114. A flush system 116 periodically discharges water that combines with in situ urine, feces, and animal bedding material to form a manure mixture 118. The manure mixture may be in any form ranging from liquid to solid manure. A drain gathering system 120 collects the liquid manure mixture 118, which drains into a conduit 122 that is used to deliver the liquid manure mixture 118 to the waste processing center 104. The conduit 122 may cover any distance, such that the waste processing center 104 may be located within the waste supply facility 102, adjacent thereto, or several miles removed therefrom. Drainage action of the conduit 122 may be assisted, as needed, by the action of pumps and/or meters (not shown).

The waste processing center 104 may be nothing more than a facility that blends, filters, and/or chops the liquid manure mixture 118 to provide a desired consistency. Additional processing is optionally performed, for example, using conventional chemical, thermal, and mechanical techniques described above in context of the prior art. Conventional aerobic and/or anaerobic fermentation processes may be combined with chemical reactions in each of manure storage facility 124 or lagoon 126, for example, according to the disclosure of U.S. Pat. No. 6,503,394 issued to Hoyt, U.S. Pat. No. 6,071,418 issued to Tai, or similar processes. The manure storage facility 124 may be a tank array (not shown), manure pile, or other facility used to store manure under winter conditions. The manure storage facility and/or lagoon 126 are optionally omitted and may be replaced with any equivalent structure known in the art.

Processed liquid manure 118A exiting waste processing center 104 travels through a conveyance 128, such as a pipeline or truck, for delivery to the waste disposal field 106. A dispenser assembly 130 applies the processed liquid manure 118A to the waste disposal field 106. The dispenser assembly 130 may be a conventional center pivot liquid manure dispenser, for example, as described in U.S. Pat. No. 6,138,928 issued to LaRue et al. Alternatively, the dispenser assembly may be a sludge gun, as U.S. Pat. No. 4,515,311 issued to Takata, or any other conventional mechanism used to apply liquid manure products to a field.

Figure 2:
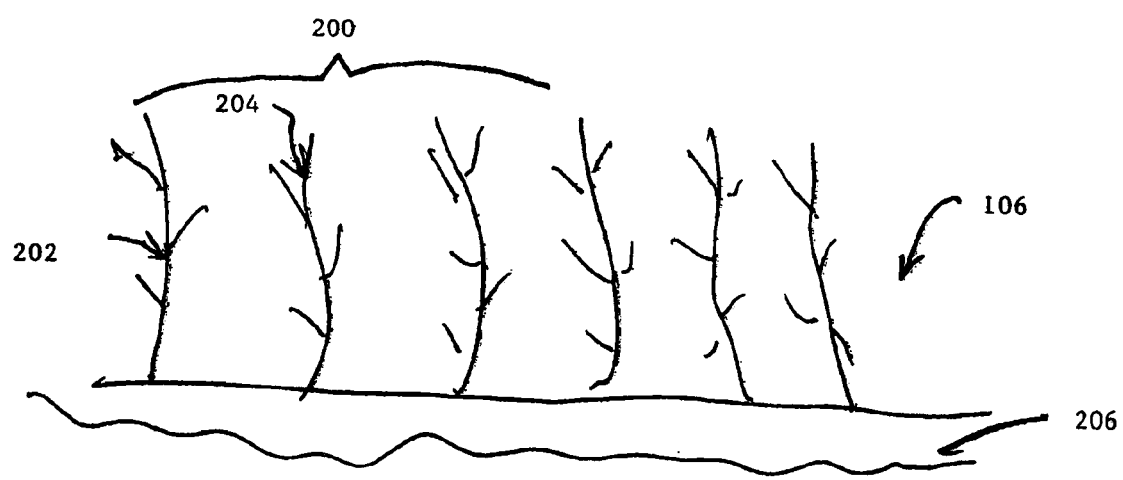
FIG. 2 shows a cultivar for use in the waste management system.

FIG. 2 provides additional detail with respect to the waste disposal field 106. An agricultural crop 200 including plants 202, 204 is planted in soil 206 of the waste disposal field 106. Plants 202, 204 are preferably alfalfa or clover.

It is common practice for breeders to describe alfalfa cultivars on a dormancy scale from one to ten where one indicates plants that are suitable for use in the coldest climates, and ten indicates plants that are suitable for use in warmer climates. The lower numbers indicate slower growth but better ability to survive in colder climates. The higher numbers indicate faster growth but less ability to survive in colder climates. By way of example, a dormant cultivar most suitable for use in Alberta, Canada may be assigned a one, whereas a non-dormant cultivar suitable for use in Southern California may be assigned a ten. The term "dormant" in this context describes the propensity of alfalfa to go dormant in the fall and reemerge in the spring. A cultivar rated four on the dormancy scale might be expected to grow about seven inches within four weeks after a September harvest. In contrast, a cultivar rated eight might grow sixteen inches under similar conditions. Alfalfa can be selected as dormant and non-dormant cultivars to accommodate widespread climactic conditions in almost any geographic location. Another method of dormancy classification lacks a numeric scale, and divides cultivars into dormant, semi-dormant, and non-dormant classes. These classes roughly correspond to the numeric scale as 1–4 being dormant, 5 and 6 being semi-dormant, and 7–10 being non-dormant. Even the non-dormant class may still go somewhat dormant in the winter and increase growth in the spring.

Breeders of alfalfa and clover have active programs that advance the art by providing new cultivars selected for enhanced performance under adverse conditions. Superior manure tolerance has recently been discovered and confirmed by comparative experimentation in a cultivar designated JM-1 (PTA-5044) which was developed by ABI Alfalfa, located in Lenexa. Kans. The JM-1 cultivar is a dormancy 4 cultivar bred for use in colder climates, and one that baa been either tested or selected to confirm increased yield and stand count under conditions of traffic, grazing and manure stress. Additional cultivars developed by ABI Alfalfa Inc. using proprietary traffic, grazing and manure stress methodologies include those listed in Table 2 below. All of these cultivars are being deposited with the American Type Culture Collection of Rockville, Md. under terms of the Budapest Treaty and allocated the following patent deposit designations (PTA):

TABLE 2

ABI Cultivars bred for Traffic and Manure Tolerance

| ALFALFA CULTIVAR | Fall Dormancy | PTA- |
|---|---|---|
| JM-1 | 4 | 5044 |
| JM-2 | 1 | 5045 |
| CB-1 | 9 | 5042 |
| CB-2 | 7 | 5043 |
| CLOVER | | |
| JM-3 | N/A | 5046 |

The JM-1 cultivar was developed, as shown in the non-limiting examples below, to confirm improved performance in areas of traffic, grazing and manure stress. Originally bred for grazing tolerance, testing confirms that the JM-1 cultivar demonstrates superior tolerance to heavy traffic and is characterized by being able to provide comparatively increased yield and stand count when used as crop 200 shown in FIG. 2 and stressed with heavy manure applications. Example 1 describes the process that ABI Alfalfa used to select for JM-1 under conditions of intensive grazing stress. It is acknowledged that intensive grazing is associated with attendant animal hoof traffic and animal defecation at locations according to animal preference; however, the selection process of Example 1 was not controlled for these parameters.

Land races or cultivar species are constantly being improved in the alfalfa industry by selective breeding processes. These processes operate on the hypothesis that superior genetic stock may be found when knowledgeable persons select plants that demonstrate superior performance under exposure to harsh conditions that stress the plants. By way of example, selection of healthy plants exhibiting large root structure and large crowns may be made after subjecting alfalfa to harsh conditions of traffic, grazing, manure loading, insufficient water supply, high salt content in soil or water, exposure to pathogens, or excessive amount of fertilizer. The resulting cultivars may be further improved by addition of transgenes via recombinant DNA practices.

The following non-limiting examples show preferred materials and methods for use in plant selection, as well as comparative studies that show yield and stand count may be improved by these practices. In the case of the JM-1 cultivar shown below, phenotypical selection emphasizing large root structure and healthy crown was made under stressful conditions of traffic, grazing and manure. The JM-1 cultivar has been tested to confirm superior performance under stressful conditions of traffic, grazing, manure and fertilizer loading.

EXAMPLE 1

Breeder Selection of JM-1

Heavy Grazing Stress

Soil samples were taken from a non-irrigated fenced pasture located near Warrensburg, Mo., and subjected to chemical analysis. Initial stocks of two ABI cultivars (SD-1 and SD-2) were planted in replicated plots 300 feet long by ten feet wide. These cultivars, rated at 4 on the dormancy scale, were planted near Warrensburg, Mo. during the first week of April, 1991. Conventional agricultural practices for planting alfalfa were utilized according to commercial practices specified by ABI Alfalfa for use of their products. Plants were allowed to grow and mature for sixty-five days. Cattle were introduced into the pasture and permitted to graze the alfalfa until the alfalfa was uniformly less than about six inches in height. From time to time, cattle were added and removed from the pasture in a grazing profile assuring that constant animal traffic and grazing prohibited the alfalfa from growing taller than about six inches in height, but also that the alfalfa was not overgrazed to a point of dormancy caused by cropping the crown too close to the ground. The cattle were removed in mid-September. In 1992, cattle were reintroduced into the pasture in the first week of May. The grazing profile was repeated until mid-September when the cattle were removed. In 1993, cattle were again reintroduced into the pasture during the first week of May for repeat of the grazing profile until mid-September when the cattle were removed.

Two weeks after the cattle were removed in September of 1993, plants were undercut for visual inspection of the root and crown structure in the remaining plants. Visual observations and stand counts showed that the intensive grazing over a period of years had significantly stressed the plants causing over 90% of them to die over localized areas. Remaining plants were selected by a trained expert in alfalfa for large root structure, large crown, and overall health of the plant. It was observed during the initial selection process that plants tending to survive under heavy traffic, grazing and defecation stress were characterized by increased dormancy, so the selection profile was adjusted to also select for less dormancy. These plants were taken to a greenhouse, planted, and crossed for the production of synthetic generation 1 seed (Syn 1). The Syn 1 seed was planted near Nampa, Id. in 1994 for production of Syn 2 seed.

Syn 2 seed was harvested and transported to a non-irrigated fenced pasture located in Napier, Iowa, where the seed was planted during the first week of April, 1995. Conventional agricultural practices for planting alfalfa were utilized according to commercial practices specified by ABI Alfalfa for use of their products. Plants were allowed to grow and mature for sixty-five days. Cattle were introduced into the pasture and permitted to graze the alfalfa until the alfalfa was uniformly less than about six inches in height. From time to time, cattle were added and removed from the pasture to assure that constant animal traffic and grazing prohibited the alfalfa from growing taller than about six inches in height, but also that the alfalfa was not overgrazed to a point of dormancy by cropping too close to the ground. The cattle were removed in mid-September. In 1996, cattle were reintroduced into the pasture during the first week of May for repeat of the grazing profile until mid-September when the cattle were removed. In 1997, cattle were again reintroduced into the pasture during the first week of May for repeat of the grazing profile until mid-September when the cattle were removed.

Two weeks after the cattle were removed in September of 1997, plants were undercut for visual inspection of the root structure in the remaining plants. Visual observations and stand counts showed that the intensive grazing over a period of years had significantly stressed the plants causing over 50% of them to die over localized areas. Remaining plants were selected by a trained expert in alfalfa for large root structure, large crown, and overall health of the plant. These plants were taken to a greenhouse, planted, and crossed for the production of seed. The seed was harvested and received the internal designation "ZG 9840." ABI Alfalfa registered this cultivar as AmeriStand 403T™ with the Federal Seed Lab and National Alfalfa Variety Review Board Association. ZG 9840 and AmeriStand 403T™ are alternatively referred to herein as JM-1.

The foregoing methodology was used to stress alfalfa to the point of near death under conditions of heavy grazing. The hypothesis of utilizing these conditions is that only those plants having a genetic advantage will survive in a healthy state. By selecting for the observed advantages of healthy survival with large root structure and large crown, the traits are passed among the progeny of surviving plants. Multiple selections in respective phases of three-year to 4-year grow-out increasingly select for the observed advantages as heritable traits.

EXAMPLE 2

Comparative Study of JM-1 Cultivar Against other Cultivars Ancillary Phenotypic Traits The JM-1 cultivar was grown for two years in a comparative study against other commercial cultivars grown under space plant conditions. These other cultivars represented the most widely planted alfalfa cultivars in the United States selected from among different alfalfa breeders to reflect different genetic source materials: GENEVA™ from Syngenta, REBOUND 4.2™ from Croplan Genetics, FQ 315™ from Cargill/Mycogen, DK 140™ from DeKalb/Monsanto, GH 757™ from Golden Harvest, MAGNUM V™ from Dairyland Seed, 5454™ from Pioneer, 54Q53™ from Pioneer, and WL 323™ from WL Alfalfa. These other varieties were not bred or selected for tolerance to heavy traffic, grazing and defecation. After two years, plants were harvested including the root structure. Weight analysis showed that the JM-1 crown and upper six inches of root, on average weighed at least 200 percent more than that for the other cultivars. The total nonstructural carbohydrate nutritional content (TNC) was measured by chemical analysis at the University of Minnesota. Table 3 compares the results of this chemical analysis.

TABLE 3

Root Energy Comparisons - 3 Year Averages

| Variety | Avg. % TNC | JM-1 % Root Energy Advantage |
|---|---|---|
| Pioneer 54Q53 ™ | 19.82 | 13% |
| Magnum V ™ | 15.40 | 45% |
| FQ 315 ™ | 13.79 | 62% |
| WL 323 ™ | 13.74 | 63% |
| Geneva ™ | 12.60 | 77% |
| Rebound 4.2 ™ | 12.07 | 84% |
| Pioneer 5454 ™ | 12.05 | 84% |
| DK 140 ™ | 10.99 | 103% |
| GH 757 ™ | 10.58 | 110% |

Phenotypically, a comparatively larger root structure of the JM-1 cultivar provides more carbohydrate storage that enables better winter survival, as well as more energy for regrowth after harvest and during stress, such as stress imposed by weather, traffic, grazing, defecation, manure application, disease, insects and other stress variables. On average, the JM-1 cultivar grown for two years stored 48% more carbohydrate in its roots than did the other cultivars. Additional advantages include better recovery after harvest, more protection against freezing of plant tissues, and a better spring green-up. Deeper-set crowns provide better traffic protection and less heaving, which results in less crown damage and less opportunity for disease intrusion.

Phenotypical trait comparisons show that the JM-1 cultivar produces relatively more crown buds, more stubble leaves, and more stems per plant than to other commercial cultivars. By comparison of JM-1 to other commercially available cultivars, JM-1 cultivar provides faster recovery after harvest, more yield, finer stems that increase protein nutrients, and higher energy reserves for winter survivability. Test results also show that JM-1 has increased resistance to crown rots including Phoma crown rot. High resistance to this disease increases persistence and is unique among commercially available cultivars.

EXAMPLE 3

Comparative Yield and Stand Study of JM-1 Cultivar

The following non-limiting example provides a comparative study that demonstrates superior yield and stand performance of JM-1 under conditions of heavy liquid manure loading. The JM-1 cultivar was seeded into a non-irrigated field near Waseca, Minn. during May of 2000. Seeding was performed according to conventional agricultural practices for this cultivar, as specified by ABI Alfalfa. The cultivar was grown for three years. The crop was permitted to grow and was harvested twice during 2000, with no yields recorded. During the 2001 growing season, plots were harvested three times, (July, August and September). During 2002 plots were harvested four times, but the first harvest (June) yields were lost due to electronic weigh system malfunction. Liquid hog manure was applied four times at 5000 gallons per acre eight to ten days after the July and August 2001 harvests, as well as the July and August 2002 harvests. Yields reported here are all after the initial manure treatment in July 2001 and include two harvests in 2001 and three in 2002.

Other commercially available cultivars, representing different genetic sources, were grown under identical conditions over the study period. All plantings were in replicated test plots. Testing was conducted in the same field with the plots being grown side-by-side. The alfalfa was harvested from all plots, and comparative statistics were calculated for yield (tons per acre) and stand count (plant density) of each crop.

Yield results are shown in Table 4, which shows the JM-1 cultivar having a yield advantage (calculated as a percent difference) ranging from 4% to 21%, or 14% overall. Table 3 also shows a stand count advantage.

TABLE 4

Comparative Yield Performance With Manure Applied

| Cultivars | Brand | Yield - Manure Treated tons/acre | JM-1 % Yield Advantage vs. Other Cultivars |
| --- | --- | --- | --- |
| JM-1 | America's Alfalfa | 6.4 | |
| Magnum V ™ | Dairyland Seed | 6.2 | 4% |
| 54Q53 ™ | Pioneer | 5.6 | 14% |
| DK 140 ™ | DeKalb/Monsanto | 5.4 | 19% |
| WL 327 ™ | WL Alfalfa | 5.7 | 12% |
| Rebound 4.2 ™ | Croplan Genetics | 5.3 | 21% |
| MEAN | | 5.7 | 14% |

Stand count results are shown in Table 5, which shows the JM-1 cultivar having a stand advantage(calculated as a percent difference from JM-1) ranging from 14% to 30%, or 18% overall.

TABLE 5

Comparative Stand Performance With Manure Applied

| Cultivars | Brand | Stand Count Manure Treated | JM-1 % Stand Advantage vs. Other Cultivars |
| --- | --- | --- | --- |
| JM-1 | America's Alfalfa | 4.8 | |
| Rebound 4.2 ™ | Croplan Genetics | 3.7 | 30% |
| DK 140 ™ | DeKalb/Monsanto | 4.0 | 20% |
| MagnumV ™ | Dairyland Seed | 4.2 | 14% |
| WL 321 ™ | WL Alfalfa | 4.2 | 14% |
| 54Q53 ™ | Pioneer | 4.2 | 14% |
| MEAN | | | 18% |

Stand scores = % ground cover when multiplied by 10

EXAMPLE 4

Control Study

Control plots for each variety were also grown under the same conditions as the comparative study shown in Example 3, but without the application of liquid manure. Table 6 shows the yield results from the study. Thus, Tables 4 and 6 cumulatively reveal that the JM-1 cultivar is able to better withstand heavy manure loading than other commercial cultivars, and the JM-1 cultivar improves its yield in a comparative sense under conditions of heavy manure loading. Table 7 similarly confirms improvement in stand count by comparison against Table 5.

TABLE 6

Comparative Yield Performance - Control With No Manure Applied

| Cultivars | Yield - tons/acre Control-No Manure |
| --- | --- |
| JM-1 | 6.1 |
| Rebound 4.2 ™ | 6.5 |
| DK 140 ™ | 6.4 |
| Magnum V ™ | 6.5 |
| WL 327 ™ | 7 |
| 54Q53 ™ | 6.2 |
| MEAN | 6.5 |

*TABLE 7

Comparative Stand Performance - Control with No Manure Applied

| Cultivars | Control-No Manure* | JM-1 % Stand Advantage vs. Other Cultivars |
| --- | --- | --- |
| JM-1 | 7.2 | |
| Rebound 4.2 ™ | 7.3 | −1% |
| DK 140 ™ | 6.7 | 7% |
| Magnum V ™ | 6.7 | 7% |
| WL 327 ™ | 7.0 | 3% |
| 54Q53 ™ | 6.5 | 11% |
| MEAN | 6.9 | 4% |

*stand scores = % ground cover when multiplied by 10

EXAMPLE 5

Other Fertilizers

The comparative studies of Examples 3 and 4 were repeated using different fertilizers. Table 8 below shows comparative yield results between grow-outs with no manure (control), liquid manure, liquid manure supplemented with 0.31M sodium chloride (NaCl; 750 lb/acre in 5000 gallons/acre of liquid manure), liquid manure supplemented with 0.74 M ammonium ($NH_4$; 425 lb/acre applied as ammonium sulfite $NH_2SO_4$ in 5000 gallons per acre of liquid manure), and liquid manure supplemented with 0.31 sodium chloride in combination with 0.74 M ammonium. The JM-1 cultivar is the only cultivar confirmed for traffic, grazing and manure tolerance listed in Table 8 below.

TABLE 8

Yield Comparison by Fertilizer Type
Tons per Acre

| Cultivars | Control | Manure | Man + NaCl | Man + NH4 | Manure + NaCl + NH4 |
| --- | --- | --- | --- | --- | --- |
| JM-1 | 6.1 | 5.7 | 4.8 | 5.5 | 4.4 |
| Magnum V ™ | 6.5 | 5.5 | 4.5 | 5.2 | 4.1 |
| WL 327 ™ | 7 | 5.1 | 4.1 | 4.7 | 3.5 |
| 54Q53 ™ | 6.2 | 5 | 4.3 | 5 | 3.5 |
| DK 140 ™ | 6.4 | 4.8 | 4.2 | 4.8 | 3.6 |
| Rebound 4.2 ™ | 6.5 | 4.7 | 4.0 | 4.8 | 3.6 |
| Overall Average | 6.45 | 5.13 | 4.32 | 5.00 | 3.78 |
| Avg of Non JM-1 Cultivars | 6.53 | 5.02 | 4.22 | 4.90 | 3.66 |
| JM-1 % of Non JM-1 Cultivars Average | 93.6 | 113.5 | 113.7 | 112.2 | 120.2 |

EXAMPLE 9

Cultivar JM-2

In April 1994, seeds of alfalfa cultivars PJS-1 and PJS-2 from ABI Alfalfa were planted in replicated, non-irrigated, fenced plots near Napier, Iowa. Conventional agricultural practices for planting alfalfa were used according to commercial practices specified by ABI for use of their products. Approximately 65 days after planting, cattle were introduced into the plots, which were beginning to bloom, in sufficient numbers to keep the alfalfa from attaining a regrowth height of more than 6 inches. Cattle were removed from the plots in mid-September. In 1995, plots were grazed by cattle beginning in mid-May for repeat of the grazing profile until mid-September when the cattle were removed. In 1996 cattle were again allowed to graze the plots beginning in mid-May for repeat of the grazing profile until mid-September when the cattle were removed.

Two weeks after the cattle were removed in 1996, plots were undercut for visual inspection of the root and crown structure in the remaining plants. Visual observations and stand counts showed that the intensive traffic, grazing and defecation had, over a period of years, significantly stressed the plants causing over 90% of them to die. A trained expert in alfalfa made selections from the remaining plants based on large healthy roots and crowns.

The selected plants were placed in plastic pots in the greenhouse and crossed by hand for seed production. Seed from the greenhouse production was seeded into fenced, non-irrigated plots near Napier, Iowa in April of 1997. Plots were trafficked and grazed continuously by cattle, beginning 65 days after planting, never allowing regrowth to reach a height of more than 6 inches. Cattle were removed in mid-September. In 1998, cattle were reintroduced in the plots during mid-May for repeat of the grazing profile until mid-September. In 1999, cattle were again allowed to traffic and graze the plots from mid-May until mid-September limiting regrowth to 6 inches or less.

Two weeks after the cattle were removed in September of 1999, plants were undercut for visual inspection of the root and crown structure and health. Visual observations and stand counts showed that intensive animal traffic and grazing resulted in the death of over 50% of the original plants. A trained expert in alfalfa made selections from the remaining plants based on large healthy roots and crowns. Selected plants were planted in a greenhouse and hand-crossed for the production of seed. The seed received an internal designation of JM-2 (PTA-5045).

EXAMPLE 10

Cultivar JM-3

Red Clover

On Apr. $11^{th}$ of 1994, seeds of the red clover cultivar Concorde were planted in replicated, non-irrigated, fenced plots near Warrensburg, Mo. Conventional agricultural practices for planting red clover were used according to commercial practices specified by ABI for use of their products. Approximately 65 days after planting cattle were introduced into the plots, which had attained a height of about 16 inches. The cattle were maintained in sufficient numbers to keep plants from attaining a re-growth height of more than 6 inches. Cattle were removed from the plots in late September. In 1995, cattle were reintroduced into the plots in the first week in May for repeat of the grazing profile until late September when the cattle were removed. In mid April of 1996, plants were undercut for visual inspection of the root and crown structure in remaining plants. Visual observations and stand counts showed that intensive animal traffic and grazing over the two-year period had significantly stressed the plants causing over 95% to die. A trained expert in red clover made selections from the remaining plants based on large healthy root structure and crowns. Selected plants were transplanted in an isolated area near Napier, Iowa and allowed to set seed with pollination by honeybees. The seed received an internal designation of SC1.

In mid April of 1997 seeds of SC1 were planted in replicated, non-irrigated, fenced plots near Napier, Iowa. Approximately 65 days after planting cattle were introduced into the plots, which were about 16 inches tall. Sufficient numbers of cattle were used to keep re-growth height to no more than 6 inches. Cattle were removed in mid September. In 1998 cattle were reintroduced into the plots in the middle of May for repeat of the grazing profile until mid-September when the cattle were removed.

Two weeks after the cattle were removed, plants were undercut for visual inspection of the root and crown structure in remaining plants. Visual observations and stand counts showed that intensive traffic, grazing and defecation over the two-year period had significantly stressed the plants causing over 60% to die. A trained expert in red clover made selections from the remaining plants based on large healthy roots and crowns. Selected plants were held and vegetatively propagated in the greenhouse over the winter and transplanted into an isolated field near Nampa, Id. in April 1999 for seed production. Pollination was by honeybees. The seed received an internal designation of JM-3 (PTA-5046).

EXAMPLE 11

Comparative Testing of Clover—Traffic, Grazing and Manure Tolerance

JM-3 was subjected to comparative testing under continuous grazing tolerance. Cattle were turned onto plots in the spring of 2001 and removed in September 2001. Plants were never allowed to reach heights over 6", using the same grazing profile as applied to cultivar JM-1 in Example 1 above. Comparative results shown in Table 9 demonstrate that, on average, the tolerant variety JM-3 gained from a 5% to a 100% stand advantage in survivability under traffic, grazing and defecation stress. Moreover, Table 10 shows JM-3 outperformed the non-tolerant varieties by 6% initially and by 207% after the application of traffic, grazing and defecation stress. RED GOLD PLUS™, KENLAND CERTIFIED™, and AGRTP 101™ are characterized as "non-tolerant" because they were not selected for traffic, grazing and defecation tolerance by the methodology applied to JM-3.

TABLE 9

Red Clover Stand Persistence Test at Lexington, KY

| Cultivars | % STAND Apr-01 | % STAND after stress Oct-01 |
|---|---|---|
| JM-3 | 90 | 40 |
| RED GOLD PLUS ™ | 86 | 20 |
| KENLAND CERTIFIED ™ | 86 | 15 |
| AGRTP 101 ™ | 82 | 5 |
| MEAN | 86 | 20 |
| % Advantage | 5% | 100% |

TABLE 10

Average Stand Persistence Results

| TYPE | % stand | % stand after stress |
|---|---|---|
| JM-3 | 90 | 40 |
| NON-JM-3 Cultivars | 84.7 | 13 |
| % Advantage | 6% | 207% |

EXAMPLE 12

Comparative Testing of Alfalfa—Traffic Tolerance

JM-1 was subjected to comparative testing under traffic testing induced by heavy machinery in a field located near the University of Wisconsin. The test methodology was to drive a 8600 pound tractor over the alfalfa 5 days after each harvest. An identical number of passes were made over other commercial cultivars that were not selected using grazing stress, as specified in Table 11, all planted in respective 4 foot by 20 foot replicated plots. Control plots were grown under identical conditions without tractor traffic. The alfalfa was harvested at regular intervals for 2 years, and yields were calculated in tons per acre. Table 11 shows that relative performance of the different cultivars changed significantly between the control and traffic plots. JM-1 demonstrated only a 4% decrease in yield due to traffic stress, whereas the other varieties on average demonstrated a 14% decrease in yield.

TABLE 11

TRAFFIC TEST YIELDS, TONS PER ACRE UNIVERSITY OF WISCONSIN

| Cultivars | No Traffic AVG | Traffic AVG | Decrease in Yield due to Traffic |
|---|---|---|---|
| JM-1 | 6.17 | 5.93 | |
| FQ 315 ™ | 6.08 | 5.31 | |
| DK 140 ™ | 6.16 | 5.24 | |
| REBOUND 4.2 ™ | 5.81 | 5.28 | |
| MAGNUM V ™ | 5.68 | 4.91 | |
| WL 323 ™ | 5.34 | 4.16 | |
| GH 757 ™ | 5.67 | 5.12 | |
| 54Q53 ™ | 5.37 | 4.40 | |
| PIONEER 5454 ™ | 5.35 | 4.79 | |
| Average for | | | |
| JM-1 | 6.17 | 5.93 | 4% |
| Non-JM-1 varieties | 5.68 | 4.90 | 14% |

Further, comparative testing by Iowa State University shows JM-1 produces better stand counts under traffic, grazing and defecation. Results for this 3 year test are shown in table 11A.

TABLE 11A

IOWA
Rhodes, Marshall County, Rhodes Research Farm
ABI Contract Grazing Trial
Planted 14 Apr. 2000; 4 × 5 Lattice, 6 reps

| | % Stand | | | |
|---|---|---|---|---|
| Cultivars | Oct. 3, 2000 | Oct. 3, 2001 | Oct. 15, 2002 | % Initial |
| JM-1 | 96 | 76 | 45 | 47 |
| Ameristand 201 + Z ™ | 96 | 76 | 45 | 46 |
| Affinity + Z ™ | 92 | 69 | 15 | 16 |
| 5454 ™ | 95 | 51 | 11 | 12 |
| FQ 315 ™ | 97 | 59 | 10 | 11 |
| WL 323 ™ | 97 | 65 | 10 | 10 |
| DK 140 ™ | 94 | 52 | 9 | 9 |
| Geneva ™ | 93 | 61 | 8 | 8 |
| 54Q53 ™ | 100 | 62 | 8 | 8 |
| Rebound 4.2 ™ | 96 | 62 | 6 | 7 |
| Magnum V ™ | 96 | 65 | 7 | 7 |
| GH 757 ™ | 100 | 58 | 7 | 7 |
| Mean | 96 | 63 | 15 | 16 |
| LSD (5%) | 8 | 14 | 11 | 12 |

Additional testing by the Universities of Wisconsin and Minnesota have demonstrated ABI Alfalfa Inc. proprietary traffic, grazing and manure stress methodologies are associated with improved winter survival. Table 11B, documents the results from this study JM-1 is a 4 dormancy cultivar with the winter survival rating of a 2 dormancy cultivar. This further demonstrates the improved phenotypic traits of JM-1 resulting from ABI Alfalfa Inc. proprietary stress methodologies. This is the first 4 dormancy cultivar to receive an independent winter survival rating of a 2 dormancy cultivar.

TABLE 11B

IMPROVED WINTER SURVIVAL
Winter Survival Test Results, 2000
from Wisconsin and Minnesota

| Cultivars | Winter Survival Index[a] | | |
|---|---|---|---|
| | Arlington, WI | Morris, MN | Average |
| BEAVER | 0.8 | 1.0 | 0.9 |
| SPREDOR 3 | 1.0 | 2.0 | 1.5 |
| 526 | 2.2 | 1.9 | 2.0 |
| VERNAL | 2.1 | 2.0 | 2.1 |
| JM-1 | 1.7 | 2.5 | 2.1 |
| SOMERSET | 2.3 | 2.1 | 2.2 |
| RELIANCE | 2.5 | 2.3 | 2.4 |
| 54V54 | 2.6 | 2.3 | 2.5 |
| WINTERGOLD | 2.6 | 2.4 | 2.5 |
| 620 | 2.8 | 2.5 | 2.6 |
| MAINSTAY | 2.6 | 2.7 | 2.7 |
| DK 140 | 3.2 | 2.4 | 2.8 |
| DK 124 | 2.8 | 2.8 | 2.8 |
| NETYIELD 500 | 3.3 | 2.4 | 2.9 |
| RANGER | 2.5 | 3.2 | 2.9 |
| GREEN FEAST | 3.2 | 2.6 | 2.9 |
| FORECAST 1001 | 3.5 | 2.4 | 2.9 |
| FORECAST 3001 | 3.5 | 2.7 | 3.1 |
| DK 141 | 3.4 | 3.3 | 3.3 |
| DART | 4.1 | 2.9 | 3.5 |
| FORTRESS | 3.9 | 3.9 | 3.9 |
| G-2852 | 4.1 | | 4.1 |
| WL 316 | | 4.3 | 4.3 |
| SOUTHERN SPECIAL | 4.6 | 4.7 | 4.6 |
| ARCHER | 4.4 | 5.0 | 4.7 |
| CUF 101 | 6.0 | 5.9 | 6.0 |
| MOAPA 69 | 6.0 | 6.0 | 6.0 |

[a]Winter survival index: 1 = superior winter survival 2 = very good 3 = good 4 = adequate 5 = low 6 = no winter survival. Planted in April 1999 and rated during April 2000

EXAMPLE 13

Development of CB-1 Alfalfa

Fall Dormancy 9

In April 1992, seeds of the alfalfa cultivars DM-3 and DM-4 from ABI Alfalfa of Lenexa, Kans. were planted in replicated, irrigated, fenced plots near Nampa, Id. Conventional agricultural practices for planting alfalfa were used according to commercial practices specified by ABI Alfalfa for use of their products. Approximately 65 days after planting, cattle were introduced into the plots, which were beginning to bloom, in sufficient numbers to keep the alfalfa from attaining a re-growth height of more than 6 inches. Cattle were removed from the plots in late September. In 1993 plots were grazed by cattle beginning in mid May for repeat of the grazing profile until late September when the cattle were removed. In 1994, cattle were again allowed to graze the plots beginning in mid May for repeat of the grazing profile until late September when the cattle were removed.

Two weeks after the cattle were removed in 1994, plots were undercut for visual inspection of the root and crown structure in the remaining plants. Visual observations and stand counts showed that the intensive grazing had, over a period of years, significantly stressed the plants causing over 90% of them to die. A trained expert in alfalfa made selections from the remaining plants based on large healthy roots and crowns.

The selected plants were placed in plastic pots in the greenhouse and crossed by hand for seed production. Seed from the greenhouse production was seeded into fenced, irrigated plots near Nampa, Id. in April of 1995. Plots were trafficked and grazed continuously by cattle, beginning 65 days after planting, never allowing regrowth to reach a height of more than 6 inches. Cattle were removed in late September. In 1996 cattle were reintroduced in the plots in mid May, and the grazing profile was repeated until late September. In 1997, cattle were again allowed to graze the plots from late May until late September, limiting regrowth to 6 inches or less.

Two weeks after the cattle were removed in September of 1997, plants were undercut for visual inspection of the root and crown structure and health. Visual observations and stand counts showed that intensive traffic, grazing and defecation had resulted in the death of over 50% of the original plants. A trained expert in alfalfa made selections from the remaining plants based on large healthy roots and crowns. Selected plants were planted in a greenhouse and hand crossed for the production of seed. The seed received an internal designation of CB-1 (PTA-5042).

EXAMPLE 14

Development of CB-2 Alfalfa—Fall Dormancy 7

In April 1993 seeds of the ABI Alfalfa cultivar 13R Supreme™ were planted in replicated, irrigated, fenced plots near Nampa, Id. Conventional agricultural practices for planting alfalfa were used according to commercial practices specified by ABI for use of their products. Approximately 65 days after planting, cattle were introduced into the plots, which were beginning to bloom, in sufficient numbers to keep the alfalfa from attaining a re-growth height of more than 6 inches. Cattle were removed from the plots in late September. In 1994, plots were grazed by cattle beginning in mid May for repeat of the grazing profile until late September when the cattle were removed. In 1995, cattle were again allowed to traffic and graze the plots beginning in mid May, and the grazing profile was repeated until late September when the cattle were removed.

Two weeks after the cattle were removed in 1995, plots were undercut for visual inspection of the root and crown structure in the remaining plants. Visual observations and stand counts showed that the animal traffic and grazing had, over a period of years, significantly stressed the plants causing over 90% of them to die. A trained expert in alfalfa made selections from the remaining plants based on large healthy roots and crowns.

The selected plants were placed in plastic pots in a greenhouse and crossed by hand for seed production. Seed from the greenhouse production was seeded into fenced, irrigated plots near Nampa, Id. in April of 1996. Plots were trafficked and grazed continuously by cattle, beginning 65 days after planting, never allowing re-growth to reach a height of more than 6 inches. Cattle were removed in late September. In 1997, cattle were reintroduced in the plots in mid May for repeat of the grazing profile until late September. In 1998, cattle were again allowed to graze the plots from late May until late September limiting re-growth to 6 inches or less.

Two weeks after the cattle were removed in September of 1998, plants were undercut for visual inspection of the root and crown structure and health. Visual observations and stand counts showed that intensive animal traffic and grazing had resulted in the death of over 50% of the original plants. A trained expert in alfalfa made selections from the remaining plants based on large healthy roots and crowns. Selected plants were planted in a greenhouse and hand crossed for the production of seed. The seed received an internal designation of CB-2 (PTA-5043).

The foregoing discussion illustrates various instrumentalities by way of example with emphasis upon the preferred embodiments. Accordingly, the disclosed embodiments and instrumentalities are not exhaustive of all options or mannerisms for practicing the disclosed principles of the invention. The inventors hereby state their intention to rely upon the Doctrine of Equivalents in protecting the full scope and spirit of the invention.

We claim:

1. A waste management system comprising,
   a supply facility for use in providing organic waste material,
   the supply facility selected from the group consisting of an agroindustrial facility, an animal production facility, a feedlot, a dairy, a poultry farm, and a sewage plant;
   land for use as a disposition point for the organic waste material;
   a conveyance for transporting the organic waste material from the supply facility to the land;
   a crop of growing on the land for use in subjecting the organic waste material deposited on the land to in vivo processing,
   the crop being breeder_specially selected for superior phenotype and survivability under at least one of grazing stress, manure loading stress and traffic stress; and
   a dispenser assembly for use in applying the organic waste material to the crop.

2. The waste management system of claim 1, wherein the supply facility comprises the agroindustrial facility, and the agroindustrial facility is further selected from the group consisting of a slaughterhouse, a paper mill, a cannery, and a tannery.

3. The waste management system of claim 1, wherein the supply facility comprises the dairy, and the dairy contains more than 200 animal units.

4. The waste management system of claim 1, wherein the supply facility comprises the feedlot, and the feedlot contains more than 200 animal units.

5. The waste management system of claim 1, wherein the supply facility comprises the sewage plant and further comprises a sludge production unit configured to provide the organic waste material.

6. The waste management system of claim 1, wherein the land is contiguous with the supply facility.

7. The waste management system of claim 1, wherein the land is remote from the supply facility and the conveyance comprises a pipeline configured to carry liquid manure.

8. The waste management system of claim 1, wherein the crop is selected by a process that causes accelerated demise of at least 50% of parent germplasm stock.

9. The waste management system of claim 1, wherein the crop comprises clover.

10. The waste management system of claim 1, wherein the crop comprises alfalfa.

11. The waste management system of claim 10, wherein the alfalfa comprises a cultivar that is processed by testing to confirm increased yields under at least one condition of traffic, grazing and manure stress.

12. The waste management system of claim 10, wherein the alfalfa comprises a cultivar that is processed by testing to confirm increased persistence under at least one condition of traffic, grazing and manure stress.

13. The waste management system of claims 11 or 12, wherein the alfalfa comprises a dormant cultivar.

14. The waste management system of claims 11 or 12, wherein the alfalfa comprises a semi-dormant cultivar.

15. The waste management system of claims 11 or 12, wherein the alfalfa comprises a non-dormant cultivar.

16. The waste management system of claim 10, wherein the alfalfa comprises JM-1.

17. The waste management system of claim 10, wherein the alfalfa comprises a JM-1 variant.

18. The waste management system of claim 1, wherein the dispenser assembly comprises a center-pivot device configured to dispense liquid manure.

19. In a waste management system that generates animal waste and disposes of the animal waste by dispensing the same onto land where a crop is planted, the improvement comprising:
   a crop of alfalfa and/or clover growing on the land, the crop of alfalfa and/or clover selected from a breeder program to provide increased yields under conditions of heavy traffic, grazing and manure stress.

20. The waste management system of claim 19, wherein the crop of alfalfa comprises a dormant cultivar.

21. The waste management system of claim 19, wherein the crop of alfalfa comprises a non-dormant cultivar.

22. The waste management system of claim 19, wherein the crop of alfalfa comprises a semi-dormant cultivar.

23. The waste management system of claim 19, wherein the crop of alfalfa comprises JM-1.

24. The waste management system of claim 19, wherein the crop of alfalfa comprises JM-2.

25. The waste management system of claim 19, wherein the crop of alfalfa comprises CB-1.

26. The waste management system of claim 19, wherein the crop of alfalfa comprises CB-2.

27. The waste management system of claim 19, wherein the crop of alfalfa comprises a JM-1 variant.

28. A method of organic waste processing and disposal in a facility, the method comprising the steps of:
   supplying organic waste material via a facility selected from the group consisting of an agroindustrial facility, an animal production facility, a feedlot, a dairy, a poultry farm, and a sewage plant;
   processing the organic waste material to provide liquid manure;
   growing a crop of alfalfa and/or clover on land, the crop being specially selected for genetics that provide at least one of superior phenotype, survivability, and yield performance under traffic, grazing and manure stress;
   transporting the organic waste material from the facility to the land; and
   depositing the liquid manure on the land for use by the crop to subject the liquid manure to in vivo processing.

29. The method of claim 28, further comprising a step of selecting the crop as alfalfa and/or clover that provides increased yields under conditions of heavy traffic, grazing and manure stress.

30. The method of claim 29, further comprising a step of selecting the crop of alfalfa and/or clover to provide increased yields under conditions of exposure to liquid manure.

31. The method of claim 28, further comprising a step of selecting the crop to include a dormant cultivar of alfalfa.

32. The method of claim 28, further comprising a step of selecting the crop to include a non-dormant cultivar of alfalfa.

33. The method of claim 28, further comprising a step of selecting the crop to include a semi-dormant cultivar of alfalfa.

34. The method of claim 28, further comprising a step of selecting the crop to include JM-1.

35. The method of claim 28, further comprising a step of selecting the crop to include alfalfa as a JM-1 variant.

* * * * *

UNITED STATES PATENT AND TRADEMARK OFFICE
CERTIFICATE OF CORRECTION

PATENT NO. : 6,887,382 B2
DATED : May 3, 2005
INVENTOR(S) : Jim Moutray and Paul Joe Solar It is certified that error appears in the above-identified patent and that said Letters Patent is hereby corrected as shown below:

Column 2,
Line 9, the words "so lagoons are" should read -- lagoons are --

Column 4,
Line 1, the words "purification of a urban organic wastes." should read -- purification of urban organic wastes. --

Column 8,
Line 5, the words "Lenexa. Kans." should read -- Lenexa, Kansas --;
Line 7, the words "that baa been" should read -- that has been --

Column 10,
Line 24, the word "4-year" should read -- four-year --

Column 11,
Line 16, the words "than to other" should read -- than do other --

Column 12,
Line 18, the words "advantage(calculated" should read -- advantage (calculated --;
Line 33, in Table 5, "WL 321 ™" should read -- WL 327 ™ --

Column 18,
Lines 20 and 67, the words "hand crossed" should read -- hand-crossed --

UNITED STATES PATENT AND TRADEMARK OFFICE
CERTIFICATE OF CORRECTION

PATENT NO. : 6,887,382 B2
DATED : May 3, 2005
INVENTOR(S) : Jim Moutray and Paul Joe Solar It is certified that error appears in the above-identified patent and that said Letters Patent is hereby corrected as shown below:

<u>Column 19,</u>
Line 21, "a crop of growing on the land for use in subjecting the" should read -- a crop growing on the land for use in subjecting the --;
Line 24, "the crop being breeder_specially selected for superior" should read -- the crop being breeder selected for superior --

Signed and Sealed this

Ninth Day of August, 2005

JON W. DUDAS
*Director of the United States Patent and Trademark Office*